United States Patent
Weizhong

(10) Patent No.: US 7,639,762 B2
(45) Date of Patent: *Dec. 29, 2009

(54) METHOD FOR RECEIVING AND RECOVERING FREQUENCY SHIFT KEYED SYMBOLS

(75) Inventor: Chen Weizhong, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/107,603

(22) Filed: Apr. 22, 2008

(65) Prior Publication Data

US 2008/0260072 A1 Oct. 23, 2008

Related U.S. Application Data

(63) Continuation of application No. 09/794,285, filed on Feb. 27, 2001, now Pat. No. 7,376,207, which is a continuation-in-part of application No. 09/709,687, filed on Nov. 10, 2000, now Pat. No. 6,487,240.

(51) Int. Cl.
*H04L 1/00* (2006.01)

(52) U.S. Cl. .............. 375/348; 375/269; 375/278; 375/334; 375/350; 708/300; 455/43; 455/214; 455/227; 455/296; 455/318

(58) Field of Classification Search .......... 375/219, 375/269, 272, 278, 303, 334, 340, 346, 348, 375/350, 296; 708/300, 321; 455/42, 43, 455/150.1, 161.2, 188.1, 205, 214, 227, 295, 455/296; 329/300–302, 318

See application file for complete search history.

(56) References Cited

U.S. PATENT DOCUMENTS

| | | | |
|---|---|---|---|
| 5,208,835 A | 5/1993 | Weeks et al. | |
| 5,377,229 A | 12/1994 | Wilson et al. | |
| 5,852,636 A | 12/1998 | Mathieu et al. | |
| 6,266,521 B1 | 7/2001 | Hattori et al. | |
| 6,487,240 B1 | 11/2002 | Chen | |
| 6,647,070 B1 | 11/2003 | Shalvi et al. | |
| 6,751,273 B1 * | 6/2004 | Park et al. ............. | 375/346 |

OTHER PUBLICATIONS

Rohani, B. et al.; "Combined MLSE/Frequency Discriminator Detection of the GSM Signal"; Vehicular Technology Conference; May 18-21 1998; pp. 419-423; vol. 1, IEEE.

(Continued)

*Primary Examiner*—Dac V Ha
(74) *Attorney, Agent, or Firm*—Robert L. King; David G. Dolezal

(57) ABSTRACT

A receiver architecture for receiving an FSK signal having a predetermined number of modulation levels includes a selectivity filter (206) for selectively passing a wanted channel and rejecting unwanted channels. The selectivity filter has a filter bandwidth of about one-half the bandwidth of a pre-modulation filter in a transmitter sending the FSK signal. A discriminator (208) is coupled to the selectivity filter for demodulating the signal. A symbol recovery processor (210) is coupled to the discriminator for recovering the symbols through a maximum likelihood sequence estimation (MLSE) technique utilizing N states for each symbol time, wherein N equals the predetermined number of modulation levels, and wherein templates used in the MLSE for symbol transitions are optimized with a bandwidth substantially less than the bandwidth of the pre-modulation filter.

20 Claims, 3 Drawing Sheets

OTHER PUBLICATIONS

Iwanami, Y.; Performance of Sequence Estimation Scheme of Narrowband Digital FM Signals with Limiter-Discriminator Detection; IEEE Journal on Selected Areas in Communications; Feb. 1995; pp. 310-315; vol. 13, No. 2; IEEE.

* cited by examiner

METHOD FOR RECEIVING AND RECOVERING FREQUENCY SHIFT KEYED SYMBOLS This application is a continuation-in-part of application Ser. No. 09/709,687, filed Nov. 10, 2000, by Chen, entitled "APPARATUS FOR RECEIVING AND RECOVERING FREQUENCY SHIFT KEYED SYMBOLS." Said application is hereby incorporated herein by reference.

FIELD OF THE INVENTION

This invention relates in general to wireless communication systems, and more specifically to an apparatus for receiving and recovering frequency shift keyed symbols.

BACKGROUND OF THE INVENTION

Digital wireless communication systems have utilized many different types of modulation for transmitting data. One type of modulation which has become popular is frequency shift keyed (FSK) modulation because of its tolerance to fading and multipath interference. The well-known Bluetooth wireless communication system, for example, utilizes two-level FSK (2-FSK) modulation. The well-known HomeRF system utilizes both 2-FSK and four-level FSK (4-FSK) modulation.

Normally in the transmitter before FSK modulation takes place, a low-pass filter is applied to the symbol sequence to be transmitted to limit the transmission bandwidth. This low-pass filter can be either a Gaussian filter such as that specified for Bluetooth and HomeRF high-speed transmission, or can be another type of cost efficient low-pass filter such as in HomeRF low-speed transmission where no exact filter type is specified. For narrow band Frequency Hopping systems such as HomeRF, the transmitter pre-modulation filter causes a significant amount of inter-symbol interference (ISI), making the symbols harder to detect in a receiver. In order not to exacerbate the ISI, prior-art FSK receivers have generally utilized relatively wide-band selectivity filters, thereby reducing adjacent channel rejection. In addition, the low-pass pre-modulation filter whose exact type also is not specified in HomeRF adds still more variation in the received signal, making message recovery in the receiver even more difficult. Additional elements, such as a post-detection filter (PDF) and a maximum likelihood sequence estimation (MLSE) element having four or sixteen states for a 2-FSK channel, and sixteen or sixty-four states for a 4-FSK channel, have been used to compensate for the ISI. Such additional elements add to the cost of the receiver and increase the total power consumption. Also, in the prior art, the templates utilized in the MLSE generally have been designed to match the bandwidth of the transmitter pre-modulation filter. Due to the fact that the transmitter pre-modulation filter in low-speed HomeRF is not specified precisely, the MLSE implementation becomes even more difficult.

Thus, what is needed is an apparatus for receiving and recovering symbols transmitted in an FSK digital wireless channel. The apparatus preferably will achieve high sensitivity and adjacent channel rejection and be sufficiently robust to tolerate the transmitter pre-modulation filter variations without the need for either the PDF or the expensive MLSE element with four or sixteen states for 2-FSK, and, with sixteen or sixty-four-states for 4-FSK.

DETAILED DESCRIPTION OF THE DRAWINGS

Figure 1:
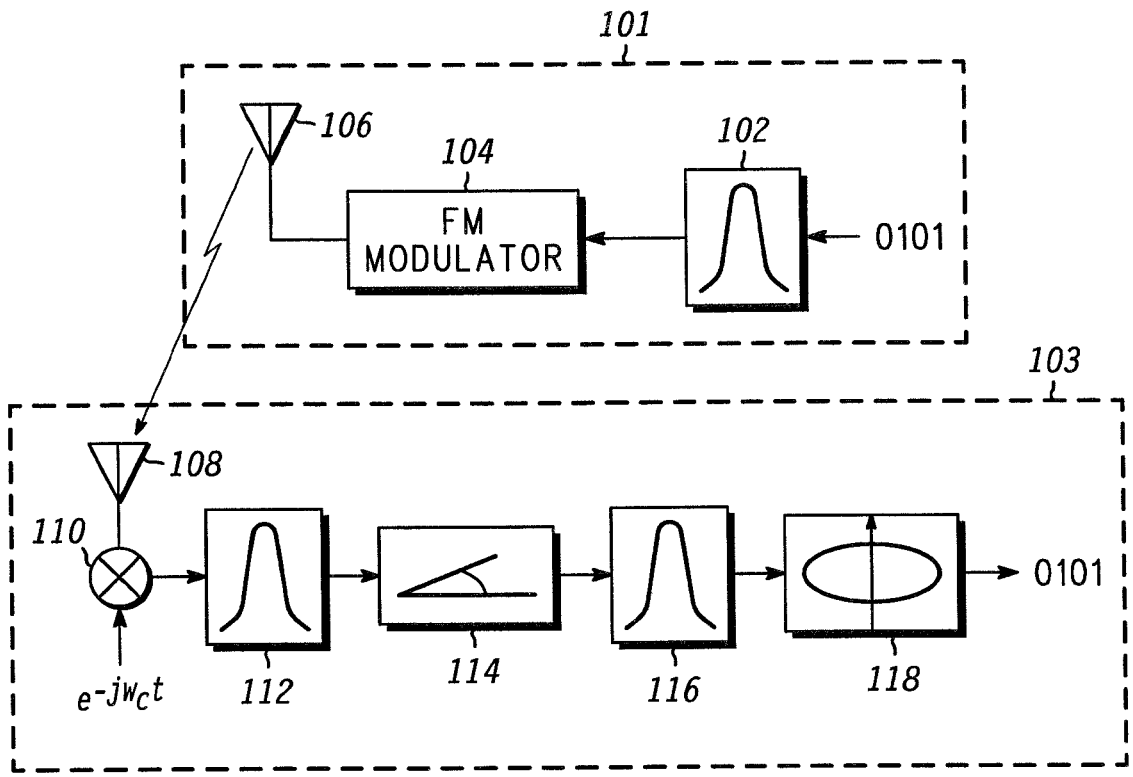
FIG. 1 is an electrical block diagram of a prior-art transceiver.

Referring to FIG. 1, an electrical block diagram of a prior-art transceiver 100 comprises a transmitter 101 and a receiver 103. The transmitter 101 preferably includes a low-pass pre-modulation filter 102 having a bandwidth. In one embodiment, e.g., for Bluetooth and high-speed HomeRF applications, the low-pass pre-modulation filter 102 is specified to be a Gaussian filter. In another embodiment, e.g., for a low-speed HomeRF application, a non-Gaussian low-pass filter is allowed. The pre-modulation filter 102 is coupled to an FM modulator 104 for generating a 2-FSK or 4-FSK radio signal, depending upon the application. An antenna 106 is coupled to the FM modulator for transmitting the signal.

The receiver 103 includes an antenna 108 for intercepting the FSK signal from the transmitter 101. The antenna 108 is coupled to a down-converter 110 for down-converting the received signal. The down-converter 110 is coupled to a selectivity filter 112 for selectively tuning a desired channel, rejecting the adjacent channel interference, and reducing the AWGN bandwidth. There has been a generally accepted rule in the prior art that the bandwidth of the selectivity filter should be not less than the bandwidth of the transmitted FSK signal, so that the inter-symbol interference (ISI) does not become severe. (The present invention advantageously allows a departure from this rule, as will be described herein below.) A discriminator 114 is coupled to the selectivity filter 112 for demodulating the receiver signal. A post detection filter (PDF) 116 is coupled to the discriminator 114 for reducing the noise non-linearly amplified by the discriminator. A slicing element 118 is coupled to the PDF for symbol recovery.

Figure 2:
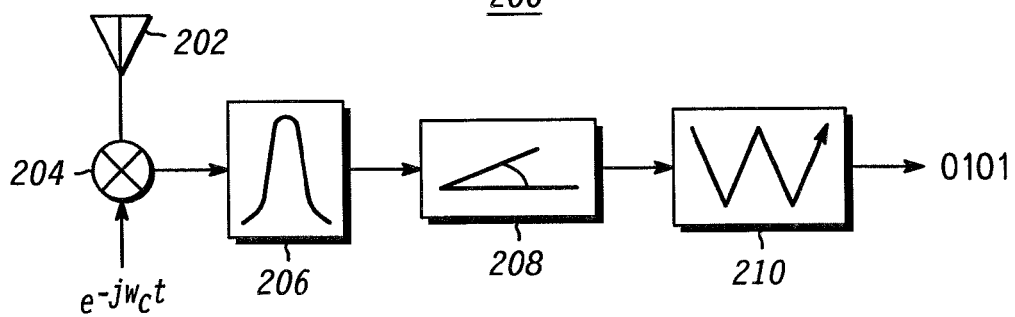
FIG. 2 is an electrical block diagram of a receiver in accordance with the present invention.

Referring to FIG. 2, an electrical block diagram of a receiver 200 in accordance with the present invention comprises a conventional antenna 202 for intercepting the signal from the transmitter 101. The received signal preferably can include both 2-FSK and 4-FSK modulation. The antenna 202 is coupled to a conventional down-converter 204 for down-converting the received signal. The down-converter 204 is preferably coupled to a selectivity filter 206 for selectively tuning the desired channel. To improve the sensitivity and the adjacent channel rejection, the bandwidth of the selectivity filter 206 is preferably about one-half the bandwidth of the pre-modulation filter 102. It is understood that this unusually narrow selectivity filter bandwidth will cause severe ISI, which will have to be compensated later in symbol recovery.

A conventional discriminator 208 is coupled to the selectivity filter 206 for demodulating the received signal.

A symbol recovery processor 210 is coupled to the discriminator 208 for recovering the symbols. The symbol recovery processor 210 preferably utilizes a conventional maximum likelihood sequence estimation (MLSE) technique utilizing N states for each symbol time, where N equals the number of modulation levels, e.g., two states for 2-FSK, and four states for 4-FSK. This is the smallest number of states possible to perform the MLSE. The small number of states advantageously minimizes the computation and power required to recover the symbols.

To compensate for the severe ISI introduced by the unusually narrow selectivity filter, the templates used in the MLSE for symbol transitions are optimized with a bandwidth substantially less than the bandwidth of the pre-modulation filter. More specifically, to compensate for the ISI caused by both the low-pass pre-modulation filter 102 of the transmitter 101 and the selectivity filter 206, the templates preferably are optimized with a bandwidth equal to the pre-modulation filter bandwidth divided by approximately the square root of three. Note that no post detection filter is required in this receiver architecture, because the unusually narrow bandwidth of the selectivity filter alone provides ample adjacent channel rejection and AWGN noise bandwidth reduction. It will be appreciated that, alternatively, the selectivity filter bandwidth and the templates can be adjusted somewhat, e.g., ±25 percent, around the preferred values, at a price of a small performance loss. It will be further appreciated that all or a portion of the receiver 200 can be manufactured in the form of one or more integrated circuits.

Tests have demonstrated that the receiver 200 exhibits significantly improved sensitivity and adjacent channel rejection as compared to the prior art receiver 103. In addition, the elimination of the post detection filter 116 and the ability to use a minimum possible number of states in the MLSE advantageously keep both cost and power consumption of the receiver 200 at low levels.

In one embodiment, the receiver 200 operates in a Bluetooth communication system. This embodiment requires the selectivity filter 206, the discriminator 208, and the symbol recovery processor 210 to be arranged and programmed to receive and recover symbols transmitted in a two-level Gaussian frequency shift keyed (2-GFSK) channel having a data rate of 1 Mbps. In another embodiment, the receiver 200 operates in a HomeRF communication system. That embodiment requires the selectivity filter 206, the discriminator 208, and the symbol recovery processor 210 to be arranged and programmed to receive and recover symbols transmitted in a 2-FSK channel at data rates of 0.8 and 5.0 Mbps, and in a 4-FSK channel at data rates of 1.6 and 10.0 Mbps. It will be appreciated that, alternatively, the receiver 200 can be operated in other systems at other data rates and with other types of modulation, and can operate with other levels of modulation.

Figure 3:
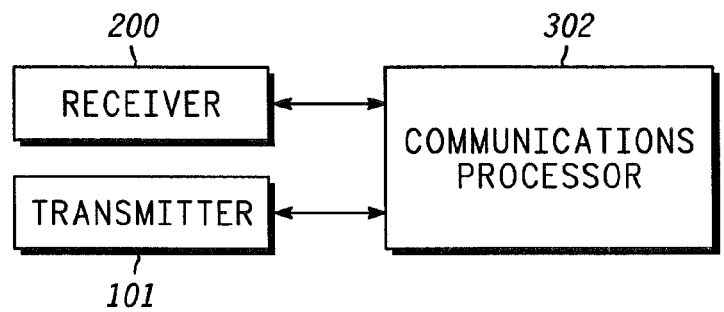
FIG. 3 is an electrical block diagram of an exemplary transceiver in accordance with the present invention.

FIG. 3 is an electrical block diagram of an exemplary transceiver 300 in accordance with the present invention. The transceiver 300 comprises the receiver 200 and the transmitter 101, both coupled to a communications processor 302 for controlling the receiver 200 and the transmitter 101. In one embodiment, the transceiver 300 is operated in a Bluetooth communication system. In another embodiment, the transceiver 300 is operated in a HomeRF communication system.

Figure 4:
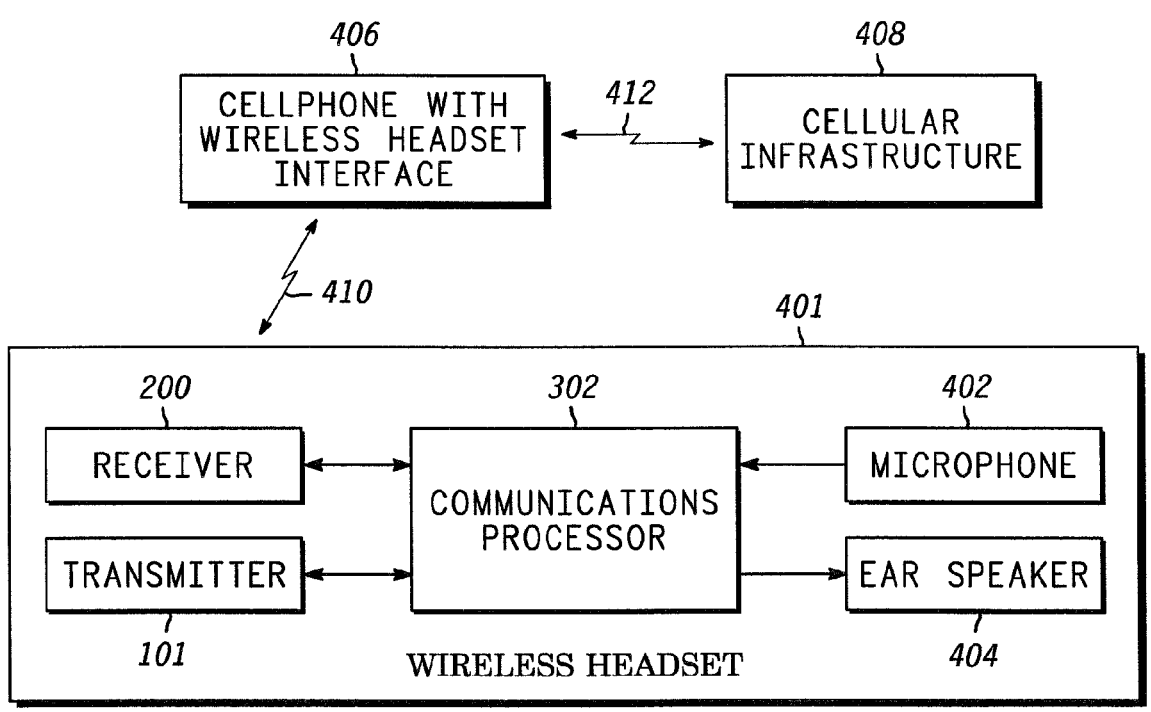
FIG. 4 is an electrical block diagram of an exemplary first wireless communication system including a wireless headset in accordance with the present invention.

FIG. 4 is an electrical block diagram of an exemplary first wireless communication system 400 including a wireless headset 401 in accordance with the present invention. The first wireless communication system 400 includes a cellular telephone 406 equipped with a wireless headset interface (not shown), preferably similar to the transceiver 300. The wireless headset 401 includes the transmitter 101 and the receiver 200 coupled to the communications processor 302 for communicating with the cellular telephone 406 over a first wireless link 410. Also coupled to the communications processor 302 are a first transducer or microphone 402 for receiving a speech input from a user, and a second transducer or ear speaker 404 for conveying to the user a message received over the first wireless link 410. The cellular telephone 406 also communicates conventionally with the cellular infrastructure 408 over a second wireless link 412. The first wireless communication system 400 advantageously allows the user to operate the cellular telephone 406 in a headset mode without requiring a cord between the cellular telephone 406 and the wireless headset 401. The first wireless communication system 400 represents an example of a Bluetooth application.

Figure 5:
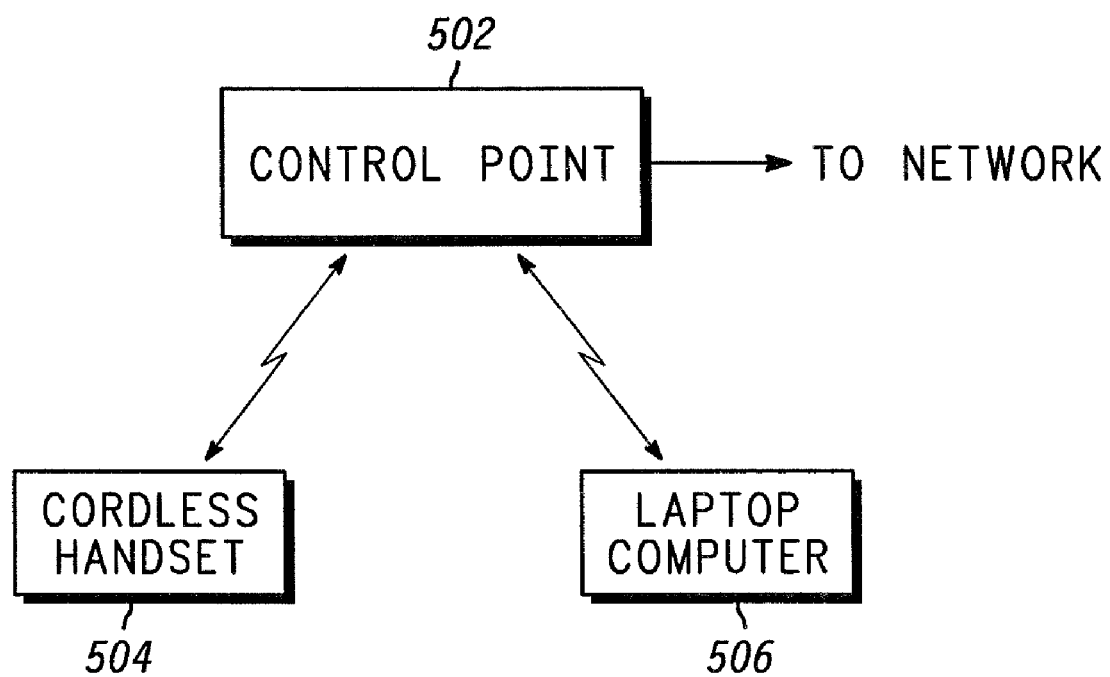
FIG. 5 is an electrical block diagram of an exemplary second wireless communication system in accordance with the present invention.

FIG. 5 is an electrical block diagram of an exemplary second wireless communication system 500 in accordance with the present invention. The second wireless communication system 500 comprises a control point 502 wirelessly coupled to a cordless handset 504 and to a laptop computer 506. The control point 502 is preferably also coupled to a network, e.g., the public switched telephone network, a local area network, or the Internet. The control point 502, the cordless handset 504, and the laptop computer 506 each preferably include the receiver 200 in accordance with the present invention. The second wireless communication system 500 represents an example of a HomeRF application.

It should be clear from the preceding disclosure that the present invention provides an apparatus for receiving and recovering symbols transmitted in an FSK digital wireless channel. The apparatus advantageously achieves high sensitivity and adjacent channel rejection and is sufficiently robust to tolerate pre-modulation filter variations.

Many modifications and variations of the present invention are possible in light of the above teachings. Thus, it is to be understood that, within the scope of the appended claims, the invention can be practiced other than as specifically described herein above.

What is claimed is:

1. A method for receiving a signal and recovering symbols transmitted over a frequency shift keyed (FSK) channel using a predetermined number of modulation levels, the symbols transmitted using a pre-modulation filter having a bandwidth, the method comprising:
   selectively passing a wanted channel and rejecting unwanted channels by a selectivity filter, the selectivity filter having a filter bandwidth of one-half the bandwidth of the pre-modulation filter;
   demodulating the signal; and
   recovering the symbols through a maximum likelihood sequence estimation (MLSE) technique utilizing N states for each symbol time, wherein N equals the predetermined number of modulation levels, and wherein templates used in the MLSE for symbol transitions are optimized with a bandwidth less than the bandwidth of the pre-modulation filter.

2. The method of claim 1, wherein the templates are optimized with a bandwidth equal to the bandwidth of the pre-modulation filter divided by the square root of three.

3. The method of claim 1, further comprising receiving and recovering symbols transmitted in a two-level Gaussian frequency shift keyed (2-GFSK) channel having a data rate of 1 Mbps.

4. The method of claim 1, further comprising receiving and recovering symbols transmitted in a two-level frequency shift keyed (2-FSK) channel at data rates of 0.8 and 5.0 Mbps, and in a four-level frequency shift keyed (4-FSK) channel at data rates of 1.6 and 10.0 Mbps.

5. The method of claim 1 further comprising down-converting the signal.

6. The method of claim 1 wherein the method is performed by a two-way portable communication device.

7. The method of claim 1 wherein the method is performed by a wireless computer.

8. The method of claim 1 wherein the method is performed by a wireless handset.

9. A method for receiving a signal and recovering symbols transmitted over a frequency shift keyed (FSK) channel using a predetermined number of modulation levels, the symbols transmitted using a pre-modulation filter having a bandwidth, the method comprising:

down-converting the received signal;

selectively passing a wanted channel and rejecting unwanted channels by a selectivity filter, the selectivity filter having a filter bandwidth of one-half the bandwidth of the pre-modulation filter, and introducing inter-symbol interference (ISI) into the wanted channel;

demodulating the signal; and recovering the symbols through a maximum likelihood sequence estimation (MLSE) technique utilizing N states for each symbol time, wherein N equals the predetermined number of modulation levels, and wherein templates used in the MLSE for symbol transitions are optimized with a bandwidth less than the bandwidth of the pre-modulation filter to compensate for the ISI, the method occurring in a single integrated circuit.

10. The method of claim 9, wherein the templates are optimized with a bandwidth equal to the bandwidth of the pre-modulation filter divided by the square root of three.

11. The method of claim 9 further comprising receiving and recovering symbols transmitted in a two-level Gaussian frequency shift keyed (2-GFSK) channel having a data rate of 1 Mbps.

12. The method of claim 9 further comprising receiving and recovering symbols transmitted in a two-level frequency shift keyed (2-FSK) channel at data rates of 0.8 and 5.0 Mbps, and in a four-level frequency shift keyed (4-FSK) channel at data rates of 1.6 and 10.0 Mbps.

13. The method of claim 9 wherein the method is performed by a two-way portable communication device.

14. The method of claim 9 wherein the method is performed by a wireless computer.

15. A method for receiving a signal and recovering symbols transmitted over a frequency shift keyed (FSK) channel using a predetermined number of modulation levels, the symbols transmitted using a pre-modulation filter having a bandwidth, the method comprising:

receiving and recovering the symbols transmitted in a two-level frequency shift keyed (2-FSK) channel, and in a four-level frequency shift keyed (4-FSK) channel;

selectively passing a wanted channel and rejecting unwanted channels by a selectivity filter, the selectivity filter having a filter bandwidth of one-half the bandwidth of the pre-modulation filter;

demodulating the signal; and recovering the symbols through a maximum likelihood sequence estimation (MLSE) technique utilizing N states for each symbol time, wherein N equals the predetermined number of modulation levels, and wherein templates used in the MLSE for symbol transitions are optimized with a bandwidth less than the bandwidth of the pre-modulation filter, said method being performed in one integrated circuit.

16. The method of claim 15 further comprising transmitting in a wireless communication system a communication signal which is received as the signal.

17. The method of claim 15, wherein the templates are optimized with a bandwidth equal to the bandwidth of the pre-modulation filter divided by the square root of three.

18. The method of claim 15 further comprising also receiving and recovering symbols transmitted in a two-level Gaussian frequency shift keyed (2-GFSK) channel having a data rate of 1 Mbps.

19. The method of claim 15, further comprising receiving and recovering the symbols that are transmitted in a the two-level frequency shift keyed (2-FSK) channel at data rates of 0.8 and 5.0 Mbps, and in the four-level frequency shift keyed (4-FSK) channel at data rates of 1.6 and 10.0 Mbps.

20. The method of claim 15 wherein the method is performed by a two-way portable communication device.

* * * * *